Figure 1:
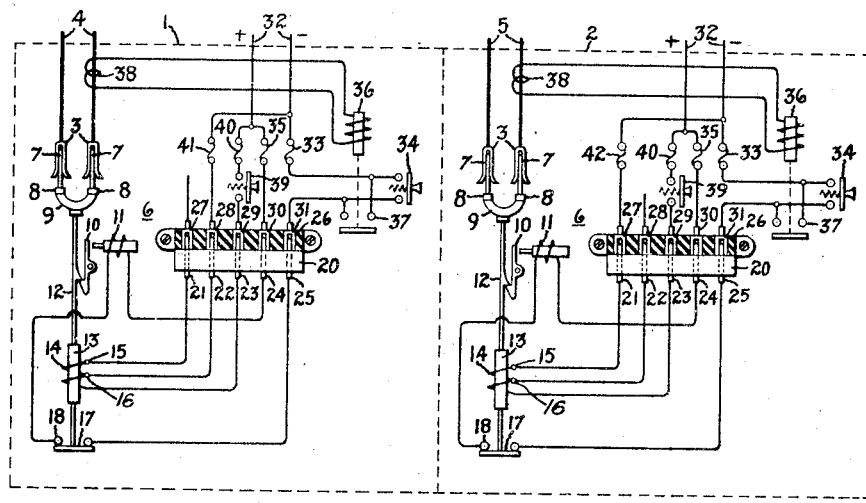

July 15, 1947.   F. E. FAIRMAN, JR   2,424,081
INTERCHANGEABLE ELECTRIC SWITCHGEAR
Filed Oct. 17, 1944

Inventor:
Francis E. Fairman Jr.,
by Harry E. Dunham
His Attorney.

Patented July 15, 1947

2,424,081

UNITED STATES PATENT OFFICE 2,424,081

INTERCHANGEABLE ELECTRIC SWITCHGEAR

Francis E. Fairman, Jr., South Ardmore, Pa., assignor to General Electric Company, a corporation of New York Application October 17, 1944, Serial No. 559,063

7 Claims. (Cl. 175—294)

My invention relates to electric switchgear and more particularly to electric switchgear of the type in which a removable electric power circuit breaker may be interchangeably related with several different electric circuits requiring different operating conditions of said circuit breaker.

Of recent years the question of power circuit breakers being equipped with proper operating mechanisms has become very important. Where a power circuit breaker is applied to controlling a class of service in which it operates substantially only in a protective capacity and as a full duty fault interrupter its mechanism must be able to close and latch even when the power circuit breaker is closed on a circuit where a fault exists that can result in a short time or momentary inrush current equal to the maximum momentary rating of the power circuit breaker. In this class of service the duty requirements of power circuit breakers insofar as frequent mechanical operation is concerned are relatively low. Such breakers might be operated less than 100 times a year. Therefore, the tendency is to build power circuit breakers with tremendously powerful operating mechanisms so as to be sure they can close and latch against the maximum momentary rating of the circuit breaker. This, of course, results in high impact forces and rough mechanical usage of the moving parts of the breaker. Due to the infrequent operation of the breaker for the above mentioned class of service such rough mechanical usage is acceptable.

Of recent years power circuit breakers have also been used in a second class of service, in a switching capacity, to control the primary high voltage circuits where these circuits supply electric arc furnaces, the main drive motors on metal rolling mills, and other similar applications. For this second class of service such power circuit breakers must be operated very frequently, and probably in excess of 40,000 operations per year. The operating action which is satisfactory when applied to a power circuit breaker for the first class of service, is not satisfactory when applied to a circuit breaker used for highly repetitive duty such as the second class of service referred to above. Frequent operation of the power circuit breaker leads to minor mechanical battering or casualty which might impair the device as a fault interrupter, and consequently power circuit breakers for highly repetitive operation necessitate the use of an operating mechanism that will close and latch the circuit breaker in a relatively gentle or "soft" manner so as to obtain the proper operating mechanical life.

Power circuit breakers employ many different types of operating mechanisms including hydraulic, pneumatic, solenoid, motor, etc. A solenoid operated mechanism, for example, may have its operation "softened" in a number of ways, such as (1) using a different mechanism; (2) using a different solenoid closing coil on the same mechanism; (3) reducing the voltage applied by the closing source of power to the solenoid winding; (4) inserting a proper value of resistance in series with the closing coil, and (5) using a solenoid closing coil with one or more taps brought out on its winding.

Most modern installations of switchgear at voltages less than 15 kv. utilize what is generally referred to as metal-clad switchgear for switching the primary alternating current circuit. Metal-clad switchgear uses removable power circuit breakers. One of the major features of metal-clad switchgear is the adherence on a given installation to duplicate interchangeable, removable power circuit breaker elements. With metal-clad switchgear the first two ways mentioned above for "softening" a solenoid operated mechanism are unsatisfactory. It would be desirable to provide electric switchgear including a plurality of circuits supplying the two different classes of service mentioned above wherein the same electric circuit breaker may be used with any circuit and its operating mechanism is automatically "softened" when applied to the circuit supplying service of the second class.

It is an object of my invention to provide electrical switchgear in which the same circuit breaker and operating mechanism can be used interchangeably to control two different classes of service, one when infrequent operation at maximum currents is required, and a second class where frequent operation of the circuit breaker at nominal opening and closing duty is required, with the proper connections being automatically cared for to produce the operation required by that class of service.

Further objects and advantages of my invention will become apparent as the following description proceeds and the features of novelty which characterize my invention will be pointed out with particularity in the claims annexed to and forming a part of this specification.

Figure 2:
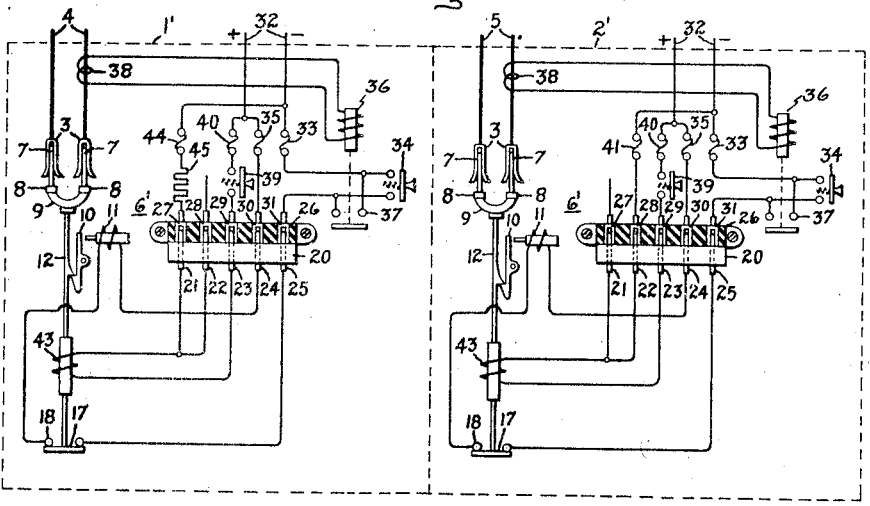

For a better understanding of my invention reference may be had to the accompanying drawing in which Fig. 1 is a schematic diagram of switchgear embodying my invention, and Fig. 2 is a schematic diagram similar to Fig. 1 illustrating a modification of my invention.

Although my invention is applicable to circuit breakers employing any kind of an operating mechanism, I have chosen to illustrate my invention specifically in connection with a solenoid operated circuit breaker. Also, although my invention is applicable with various kinds of switchgear it is particularly applicable to so-called metal-clad switchgear. Metal-clad switchgear generally comprises a plurality of housings, stationary structures or control stations in each of which are mounted the terminals of an associated electric circuit. An electric circuit breaker is adapted to be removably related with said housing or control station and adapted to be electrically connected with the terminals of said electric circuit so that said circuit may be controlled by operation of said circuit breaker. An example of a solenoid operated electric circuit breaker for use in metal-clad housings is disclosed and claimed in United States Letters Patent No. 2,293,513, Linde, granted August 18, 1942, and assigned to the same assignee as the present application.

Referring now to Fig. 1, I have illustrated schematically by dashed rectangles metal-clad housings or control stations 1 and 2. These control stations have been indicated as being mounted adjacent to one another as is the practice in metal-clad switchgear. Although only two housings have been shown it should be understood that many more than two may be arranged adjacent each other to form a unitary switchgear structure. Mounted within each housing, such as 1 and 2, are the terminals 3 which really form the stationary contact portions of the primary disconnecting devices. The stationary terminals 3 in housing 1 are connected to an electric circuit 4 which is an electric circuit adapted to supply service of the kind referred to as class 2 above in that highly repetitive operation of the circuit breaker controlling the circuit is required. On the other hand the terminals 3 fixedly mounted in control station 2, are connected to an electric circuit 5 which is a class 1 type of circuit, as referred to above, in that the circuit breaker controlling this circuit operates very infrequently and then generally only on abnormal currents.

It is desirable that circuits 4 and 5 may be controlled by identical circuit breakers with identical operating mechanisms so that the circuit breakers may be interchangeable and yet regardless of which control station, 1 or 2 a particular circuit breaker is associated with, its operating mechanism will provide the "hard" or "soft" operation required without any change whatever in the circuit breaker itself or its operating mechanism. Preferably this circuit breaker may be in the form disclosed and claimed in the above mentioned Linde patent.

Accordingly, in Fig. 1 I have illustrated a removable circuit interrupting unit 6 at each control station or within each metal-clad housing and these removable circuit breaker units are identical in every respect so that they may be interchanged. These removable circuit interrupting units 6 each comprise terminals 7 for engagement with terminals 3 which form the movable and the fixed portions respectively, of the primary disconnecting devices and engage the terminals 3 when the removable circuit breaker 6 is moved into circuit controlling position in housings 1 or 2. The circuit breaker also includes stationary contacts 8 and movable bridging contact 9. Movable bridging contact 9 is biased to the open position by gravity or any suitable means such as a spring (not shown). In order to hold movable bridging contact 9 in engagement with stationary contacts 8 suitable latching means are provided which are schematically illustrated at 10. This latching means may be released by the energization of a suitable trip coil 11. Movable contact 9 is connected by an operating rod 12 with a closing solenoid 13, including a winding 14 having taps 15 and 16, respectively. A suitable switch 17 is also connected to rod 12 so as to bridge contacts 18 when the circuit breaker is in the closed position.

The electrical circuits associated with trip coil 11 and closing coil 14 terminate in a movable secondary conductor plug 20 having a plurality of pin type contacts 21, 22, 23, 24 and 25. As illustrated, the end 15 of closing coil 14 is electrically connected to pin contact 21. The tap 16 is electrically connected to pin contact 22, while the other end of winding 14 is connected to pin contact 23. The trip coil 11 has one end thereof connected to pin contact 24 while the other end thereof is connected through contacts 18 to pin contact 25. It should be understood that the circuit breaker including the secondary conductor plug 20 and the movable portions 7 of the primary disconnecting devices comprise a structure removable as a unit from the control station or housing 1 or 2.

The secondary coupler 20 is adapted to cooperate with a corresponding stationary coupler 26 including female type contacts 27, 28, 29, 30 and 31 adapted to be electrically engaged by pin contacts 21, 22, 23, 24 and 25, respectively. A secondary coupler 26 is fixedly mounted in each control station 1 and 2 and electrically connected so as to complete the control circuit for trip coil 11 and closing coil 14. A suitable source of control power 32 is provided in each control station or housing. One side of control power source 32, which is generally a source of direct current, is connected through fuse 33 and a manually operable tripping switch 34 to female type contact 31, while the other side of control source 32 is connected through fuse 35 to a female type contact 30. Trip coil 11 is energized across female type contacts 30 and 31 through contacts 18 when tripping switch 34 is closed. In order that trip coil 11 may be automatically energized in response to overload conditions on circuits 4 or 5, I provide a relay 36 which is adapted to control normally open contacts 37 connected in parallel with the contacts of tripping switch 34. Relay 36 is energized from a current transformer 38 associated with the circuit 4 as far as control station 1 is concerned. As far as control station 2 is concerned current transformer 38 is associated with electric circuit 5.

In order to control the energization of closing coil 14 one terminal of which is connected through pin contact 23 of secondary coupler 20 with female type contact 29 of stationary coupler 26, I provide a manually controlled closing switch 39 interconnecting female type contacts 29 with one side of control power source 32 through fuse 40. The other side of control power source 32 in control station 1 is connected through fuse 41 to female type contact 28 of coupler 26. In control station 2, on the other hand, the other side of control power source 32 is connected through fuse 42 with female type contact 27. With this arrangement it will be observed that in control station 1 when secondary coupler 20 engages coupler 26 so that their associated contacts are engaged, only a portion of the turns of winding 14 are connected across the power source 32 through switch 39 whereby the solenoid operated mechanism for circuit breaker 6 is arranged to provide a "soft" or gentle operation. In control station 2, on the other hand, it will be observed that all of the turns of closing coil 14 are connected across the control power source 32 through closing switch 39. It will furthermore be observed that in accordance with my invention the circuit breakers 6 in control stations 1 and 2 which are identical may be interchanged and the operating mechanisms thereof will be automatically "softened" or "hardened" in accordance with the load circuit in which they are connected as determined by the particular control station with which they are associated.

Although in Fig. 1 I have illustrated my invention as employing a series tapped closing coil, similar results could be accomplished by the use of parallel coil sections and additional positions in the secondary coupler 26. My invention is also applicable to an arrangement in which the "soft" operation of the circuit breaker operating mechanism is obtained by connecting a resistor in series with a closing coil. The corresponding parts of Fig. 2 are designated by the same reference numerals as in Fig. 1. The closing coils 43 in control stations 1' and 2' have the lower terminals thereof connected to contacts 23, just as in Fig. 1. The only other terminals of closing coils 43 are connected to both pin contacts 21 and 22 of secondary coupler 20. In all other respects the removable units 6' of Fig. 2 are identical with the removable units 6 of Fig. 1.

One side of control source of power 32 in control station 2', as illustrated by the negative side, is connected through fuse 41 to female type contact 28 of stationary coupler 26 in exactly the same manner as in control station 1 of Fig. 1. In control station 1', on the other hand, this one side of control source of power 32 is connected through a fuse 44 and a resistor 45 with female type contact 27. It will be observed, therefore, that whenever a circuit breaker 6' is placed in control station or housing 1' the resistor 45 is automatically connected in series with closing coil 43 to provide a "soft" operation of the operating mechanism. On the other hand whenever the circuit breaker 6' is inserted in control station or housing 2' full voltage is connected across closing coil 43 so that the operating mechanism will surely be capable of closing the circuit breaker against a fault. The breakers in control stations 1' and 2' may be interchanged freely and yet the circuits 4 and 5 which provide different classes of service are controlled in the proper manner regardless of which breaker is associated with which control station.

Although I have disclosed particular embodiments of my invention, it will be obvious to those skilled in the art that modifications may be made without departing from my invention and I intend in the appended claims to cover all such changes and modifications as fall within the true spirit and scope of my invention.

What I claim as new and desire to secure by Letters Patent of the United States, is:

1. In combination with a plurality of electric control stations each including a set of terminals, an electric circuit connected to each of said sets of terminals, a unit including an electric circuit breaker adapted to be connected with the set of terminals associated with any one of said control stations to control the associated electric circuit, a first of said electric circuits being such as to require frequent operation of an associated circuit breaker at normal current and voltage, a second of said circuits being such as to require infrequent operation of an associated circuit breaker at abnormal current and voltage, operating means for moving said circuit breaker to the closed position, means associated with the control station including the set of terminals connected to said first electric circuit for causing said operating means to apply a reduced closing force to said circuit breaker when associated with said first electric circuit, and means associated with the control station including the set of terminals connected to said second circuit for causing said operating means to apply an increased closing force to said circuit breaker when associated with said second electric circuit, whereby said circuit breaker may be associated with either one of said control stations and automatically have the proper closing force applied thereto in accordance with the circuit being controlled.

2. In combination with a plurality of electric control stations each including a set of terminals, an electric circuit connected to each of said sets of terminals, a unit including an electric circuit breaker adapted to be connected with the set of terminals associated with any one of said control stations, means for operating said breaker to the closed position, a first one of said electric circuits requiring the associated circuit breaker to be operated so that the closing force applied to said circuit breaker when connected to said first circuit is considerably reduced relative to the closing force required to be applied to said circuit breaker when connected to a second of said electric circuits, and a separate means at each of said electric control stations associated with said first and second circuits for automatically controlling the closing force applied to said circuit breaker adapted to be associated therewith, whereby said circuit breaker may be used interchangeably with any control station with the proper closing force to be applied to said circuit breaker controlled automatically.

3. In an electric switching station a first electric circuit of a nature primarily requiring frequent interruption at currents within the range of normal load and to be controlled by an electric circuit breaker whose closing force is relatively low, a second electric circuit of a nature primarily requiring infrequent interruption at short circuit currents and to be controlled by an electric circuit breaker whose closing force is relatively high, a first electric control station including a set of terminals connected to said first electric circuit, a second electric control station including a set of terminals connected to said second electric circuit, a unit adapted to be connected with the set of terminals associated with either of said control stations, an electric circuit breaker associated with said units, motor means for operating said electric circuit breaker to its closed position, means at said electric control station associated with said first electric circuit for automatically reducing the closing force applied to said circuit breaker when associated with the control station of said first electric circuit whereby said circuit breaker may be used interchangeably with either of said control stations automatically to produce the required degree of closing force as determined by the nature of the electric circuit to be controlled.

4. In an electric switching station a first electric circuit of a nature primarily requiring frequent interruption at currents within the range of normal load and to be controlled by an electric circuit breaker whose closing force is relatively low, a second electric circuit of a nature primarily requiring infrequent interruption at short circuit currents and to be controlled by an electric circuit breaker whose closing force is relatively high, a first electric control station including a set of terminals connected to said first electric circuit, a second electric control station including a set of terminals connected to said second electric circuit, an electric circuit breaker adapted to be connected with the set of terminals associated with either of said control stations, means for operating said electric circuit breaker to its closed position, a separate means at each of said electric control stations associated with said first and second electric circuits for automatically controlling the closing force applied to said circuit breaker when associated therewith, whereby said circuit breaker may be used interchangeably with either of said control stations automatically to produce the required degree of closing force as determined by the nature of the electric circuit to be controlled.

5. In an electric switching station a first electric circuit of a nature primarily requiring frequent interruption at currents within the range of normal load and to be controlled by an electric circuit breaker whose closing force is relatively low, a second electric circuit of a nature primarily requiring infrequent interruption at short circuit currents and to be controlled by an electric circuit breaker whose closing force is relatively high, a first electric control station including a set of terminals connected to said first electric circuit, a second electric control station including a set of terminals connected to said second electric circuit, an electric circuit breaker forming a part of a unit adapted to be connected with the set of terminals associated with either of said control stations, means for operating said electric circuit breaker to its closed position, means at said electric control station associated with said first electric circuit for automatically reducing the closing force applied to said circuit breaker when associated therewith, whereby said circuit breaker may be used interchangeably with either of said control stations automatically to produce the required degree of closing force as determined by the nature of the electric circuit to be controlled.

6. In an electric switching station a first electric circuit of a nature primarily requiring frequent interruption at currents within the range of normal load and to be controlled by an electric circuit breaker whose closing force is relatively low, a second electric circuit of a nature primarily requiring infrequent interruption at short circuit currents and to be controlled by an electric circuit breaker whose closing force is relatively high, a first electric control station including a set of terminals connected to said first electric circuit, a second electric control station including a set of terminals connected to said second electric circuit, a unit adapted to be connected with the set of terminals associated with either of said control stations, an electric circuit breaker associated with said units, a solenoid for operating said electric circuit breaker to its closed position, means including a resistor at said electric control station associated with said first electric circuit to be connected in series with said solenoid automatically to reduce the closing force applied to said circuit breaker when associated with the control station of said first electric circuit whereby said circuit breaker may be used interchangeably with either of said control stations automatically to produce the required degree of closing force as determined by the nature of the electric circuit to be controlled.

7. In an electric switching station a first electric circuit of a nature primarily requiring frequent interruption at currents within the range of normal load and to be controlled by an electric circuit breaker whose closing force is relatively low, a second electric circuit of a nature primarily requiring infrequent interruption at short circuit currents and to be controlled by an electric circuit breaker whose closing force is relatively high, a first electric control station including a set of terminals connected to said first electric circuit, a second electric control station including a set of terminals connected to said second electric circuit, a unit adapted to be connected with the set of terminals associated with either of said control stations, an electric circuit breaker associated with said units, solenoid means including a tapped winding for operating said electric circuit breaker to its closed position, means for automatically controlling the connections to said tapped winding to reduce the closing force applied to said circuit breaker when associated with the control station of said first electric circuit whereby said circuit breaker may be used interchangeably with either of said control stations automatically to produce the required degree of closing force as determined by the nature of the electric circuit to be controlled.

FRANCIS E. FAIRMAN, JR.

REFERENCES CITED

The following references are of record in the file of this patent:

UNITED STATES PATENTS

| Number | Name | Date |
| --- | --- | --- |
| 2,225,055 | Hoye | Dec. 17, 1940 |

OTHER REFERENCES

Relays and other Devices for Electrical Control, Catalog 4071-C, Stamp dated Patent Office June 20, 1942.